US007835145B2

(12) United States Patent
Chiang et al.

(10) Patent No.: US 7,835,145 B2
(45) Date of Patent: Nov. 16, 2010

(54) PORTABLE COMPUTER

(75) Inventors: Shih-Wen Chiang, Taipei (TW);
Pao-Tung Weng, Taipei (TW); Lung-Fei Chiang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 50 days.

(21) Appl. No.: 12/410,020

(22) Filed: Mar. 24, 2009

(65) Prior Publication Data
US 2009/0295259 A1 Dec. 3, 2009

(30) Foreign Application Priority Data
May 27, 2008 (TW) .............................. 97119563 A

(51) Int. Cl.
*G06F 1/16* (2006.01)
(52) U.S. Cl. .............................. 361/679.27; 312/223.2; 248/922
(58) Field of Classification Search ............ 361/679.27; 312/223.2; 248/917–922
See application file for complete search history.

(56) References Cited

U.S. PATENT DOCUMENTS

| 5,329,289 | A * | 7/1994 | Sakamoto et al. | 248/922 |
| 5,708,561 | A * | 1/1998 | Huilgol et al. | 361/679.55 |
| 6,189,850 | B1 * | 2/2001 | Liao et al. | 248/917 |
| 6,504,707 | B2 * | 1/2003 | Agata et al. | 312/223.2 |
| 6,522,529 | B1 * | 2/2003 | Huilgol et al. | 248/919 |
| 7,042,711 | B2 * | 5/2006 | Tanaka et al. | 361/679.1 |
| 7,054,145 | B2 * | 5/2006 | Tanaka et al. | 361/679.21 |
| 7,082,028 | B2 * | 7/2006 | Huilgol et al. | 361/679.07 |
| 2005/0105258 | A1 * | 5/2005 | Tanaka et al. | 361/681 |
| 2008/0123276 | A1 * | 5/2008 | Lin et al. | 361/683 |
| 2008/0137273 | A1 * | 6/2008 | Li et al. | 361/681 |
| 2008/0278897 | A1 * | 11/2008 | Kim et al. | 361/681 |

FOREIGN PATENT DOCUMENTS

| CN | 2610385 | 4/2004 |
| TW | M280494 | 11/2005 |

* cited by examiner

*Primary Examiner*—Lisa Lea-Edmonds
(74) *Attorney, Agent, or Firm*—Muncy, Geissler, Olds & Lowe, PLLC

(57) ABSTRACT

A portable computer includes a host, a supporting frame, a displayer, two latches and a drive member. The supporting frame is pivotally connected with the host and having a straight sliding slot and a curved sliding slot. The displayer has two sliding members, which are pivotally connected with the supporting frame and slidably connected with the straight sliding slot and the curved sliding slot respectively. The displayer is operable to rotate relative to the supporting frame by either one of the two sliding members as a pivot. The two latches are slidably connected with the supporting frame. The drive member is slidably connected with the two latches and operable to control where either one of the two latches is located.

10 Claims, 8 Drawing Sheets

PORTABLE COMPUTER

RELATED APPLICATIONS

This application claims priority to Taiwan Application Serial Number 97119563, filed May 27, 2008, which are herein incorporated by reference.

BACKGROUND

1. Field of Invention

The present invention relates to a computer device, and more particularly, to a portable computer.

2. Description of Related Art

Notebook computers are very popular in the market in recent years and have become a mainstream in the computer market. The notebook computer equipped with a wide screen is another mainstream in the computer market. The wide screen is conventionally connected with a host by a landscape way, i.e. the wide screen has a relatively long edge pivotally connected with the host. The wide screen in landscape mode is beneficial for displaying movies, but has few benefits for browsing web pages or editing articles or programs, and increases a using rate of a computer mouse. For the forgoing reasons, there is a need for improving a notebook computer to satisfy both demands of the screen in landscape mode and in portrait mode.

SUMMARY

It is therefore an objective of the present invention to provide a portable computer equipped with a displayer switchable between a landscape mode and portrait mode and a lock mechanism for positioning the displayer.

In accordance with the foregoing and other objectives of the present invention, a portable computer includes a host, a supporting frame and a displayer. The supporting frame is pivotally connected with the host and having a straight sliding slot and a curved sliding slot. The displayer has two sliding members, which are pivotally connected with the supporting frame and slidably connected with the straight sliding slot and the curved sliding slot respectively. The displayer is operable to rotate relative to the supporting frame by using either one of the two sliding members as a pivot. The two latches are slidably connected with the supporting frame. The drive member is slidably connected with the two latches and operable to control where either one of the two latches is located.

In accordance with the foregoing and other objectives of the present invention, a portable computer includes a host, a supporting frame, a displayer, a latch and a drive member. The supporting frame is pivotally connected with the host and having a straight sliding slot and a curved sliding slot. The displayer has two sliding members, which are pivotally connected with the supporting frame and slidably connected with the straight sliding slot and the curved sliding slot respectively. The displayer is operable to rotate relative to the supporting frame by using either one of the two sliding members as a pivot. The latch is slidably connected with the supporting frame. The drive member is slidably connected with the latch and operable to control where the latch is located.

Thus, the present invention provides a portable computer, which is equipped with a displayer readily switchable between the portrait mode and the landscape mode for performing preferable functionalities. Moreover, a lock mechanism is also provided to temporarily secure the displayer in the portrait mode or the landscape mode to prevent from rotation.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
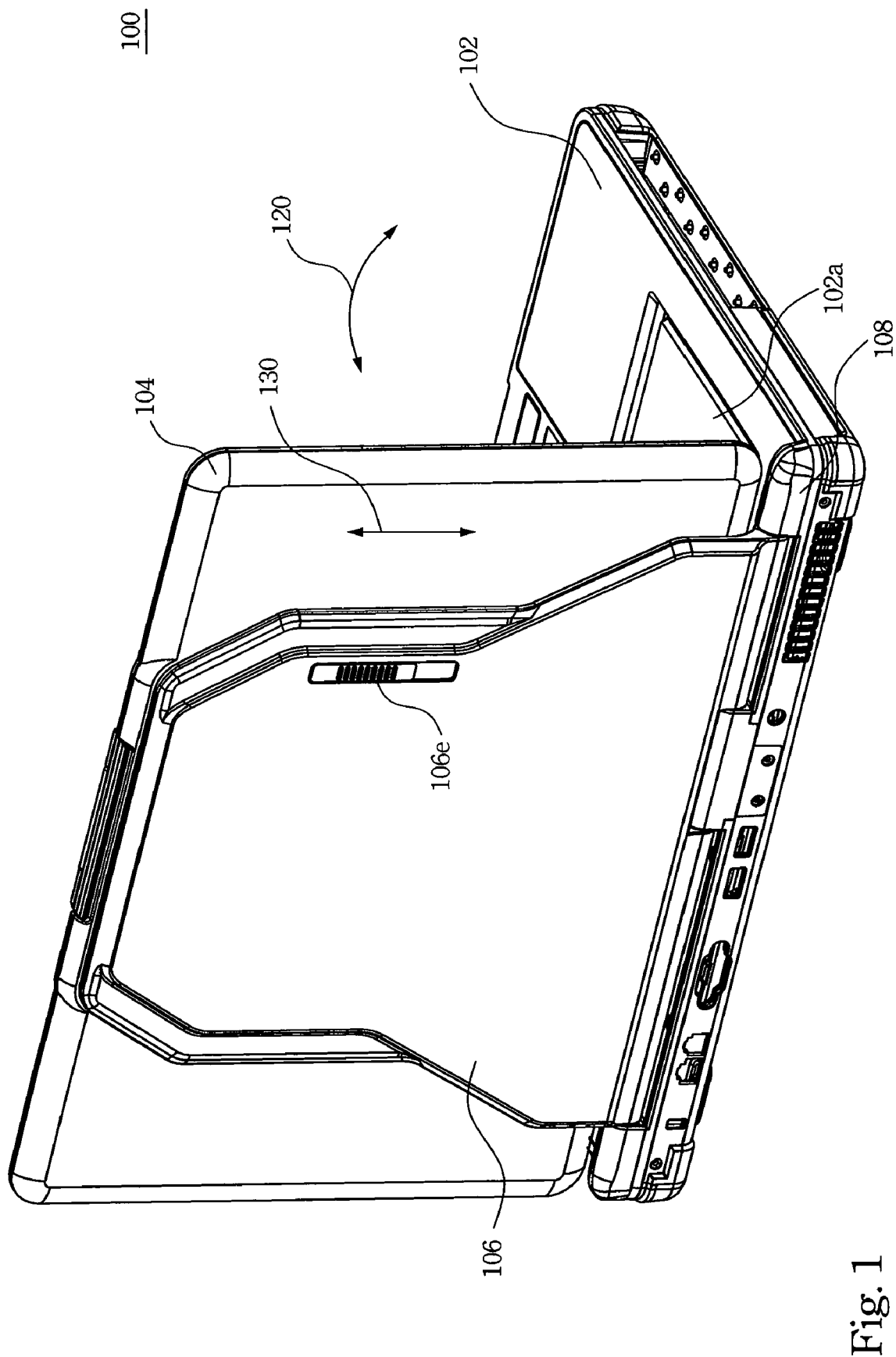
FIG. 1 illustrates a portable computer according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 illustrates a portable computer according to one preferred embodiment of this invention. The portable computer 100 includes a host 102, a displayer 104 and a supporting frame 106. The supporting frame 106 is pivotally connected with an edge of the host 102 while the displayer 104 is pivotally connected with the supporting frame 106. Therefore, the displayer 104 can be swiveled relative to the host 102 along a direction 120, by the supporting frame 106, to selectively lay against the host 102 or form an included angle between the host 102 and the displayer 104. The host 102 has a keyboard 102a while the displayer 104 has a display screen 104a. When the displayer 104 is laid against the host 102, the display screen 104a is laid against the keyboard 102a. The displayer 104 can be rotated relative to the supporting frame 106 to be selectively in landscape mode (see the displayer 104 with a relatively long edge adjacent to the host 102 in FIG. 1) or in portrait mode (see the displayer 104 with a relatively short edge adjacent to the host 102 in FIG. 8). The displayer 104 in landscape mode and in portrait mode is preferable for performing different functionalities. For example, the displayer 104 in landscape mode is preferable for displaying movies while the displayer 104 in portrait mode is preferable for browsing web pages or editing articles or programs. How the displayer 104 being switchable between the landscape mode and the portrait mode is described below. In addition, the supporting frame 106 has a control button 106e to position the displayer 104. When the displayer 104 is in portrait mode or in landscape mode, the control button 106e can be slid along the direction 130 to lock or unlock a rotation function of the displayer 104.

Figure 2:
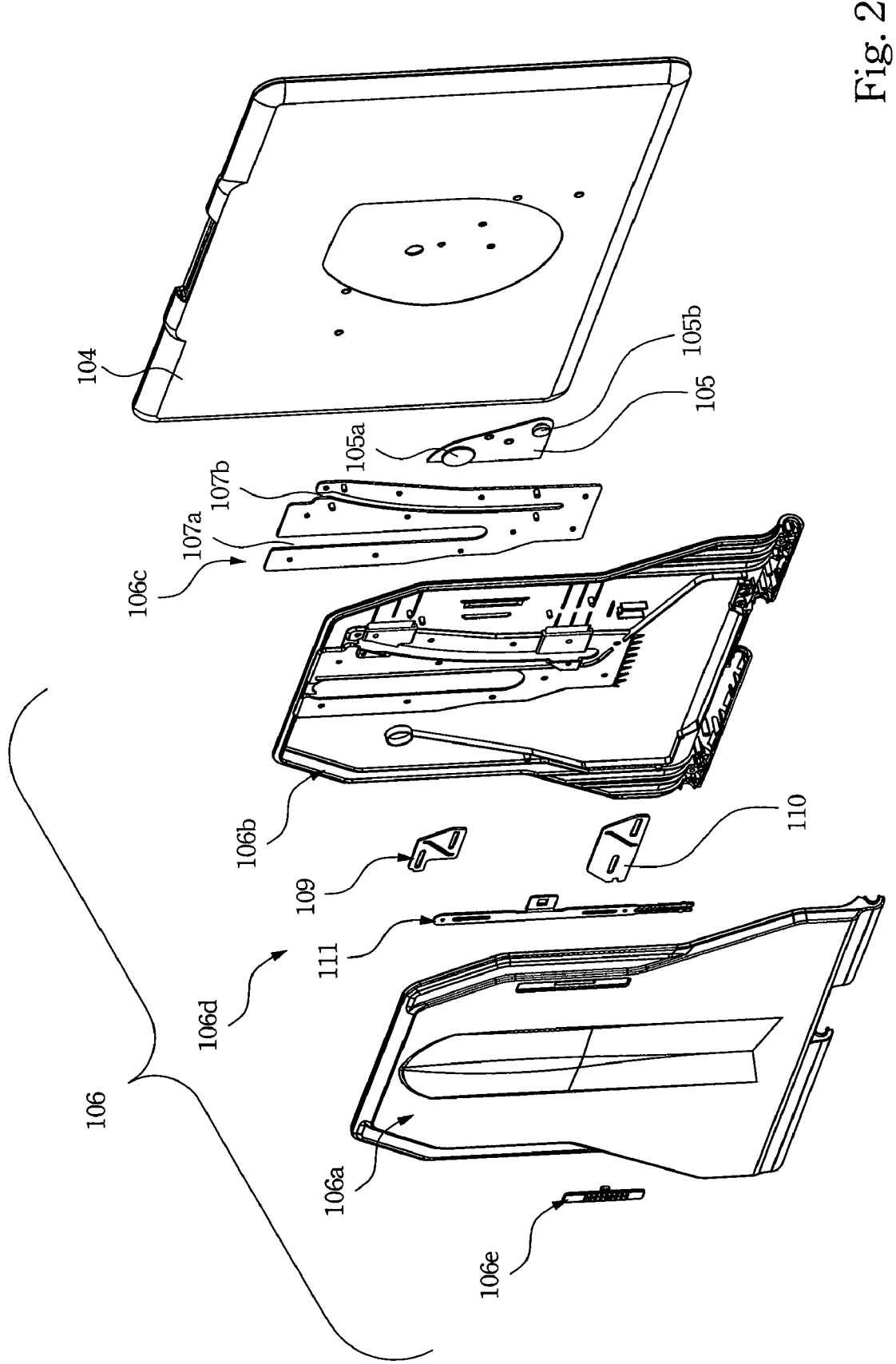
FIG. 2 illustrates an exploded view of a connection mechanism between a supporting frame and a displayer according to one preferred embodiment of this invention.

FIG. 2 illustrates an exploded view of a connection mechanism between a supporting frame and a displayer according to one preferred embodiment of this invention. The supporting frame 106 includes a housing wall 106a, a housing wall 106b, a connection bracket 106c, a lock assembly 106d and a control button 106e. The connection bracket 106c has a straight sliding slot 107a and a curved sliding slot 107b. The connection bracket 106c is attached to the housing wall 106b when all parts of the supporting frame 106 are assembled. A connection member 105 is assembled to the connection bracket 106c by respectively engaging two sliding members (105a; 105b) into two sliding slots (107a; 107b) from their lateral openings. The connection member 105 is attached to the displayer 104 with a surface excluding the sliding members (105a; 105b). In addition, the lock assembly 106d (including latches (109; 110) and a drive member 111) is assembled between the housing wall 106a and the housing wall 106b.

Figure 3:
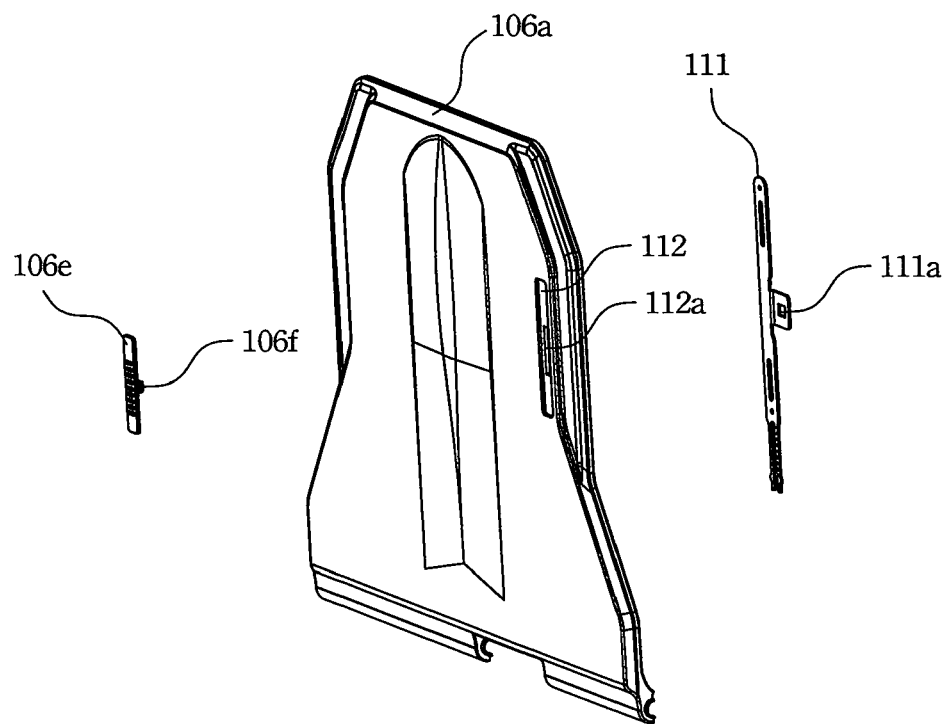
FIGS. 3-4 illustrate enlarged views of parts in connection mechanism as illustrated in FIG. 2.
Figure 4:
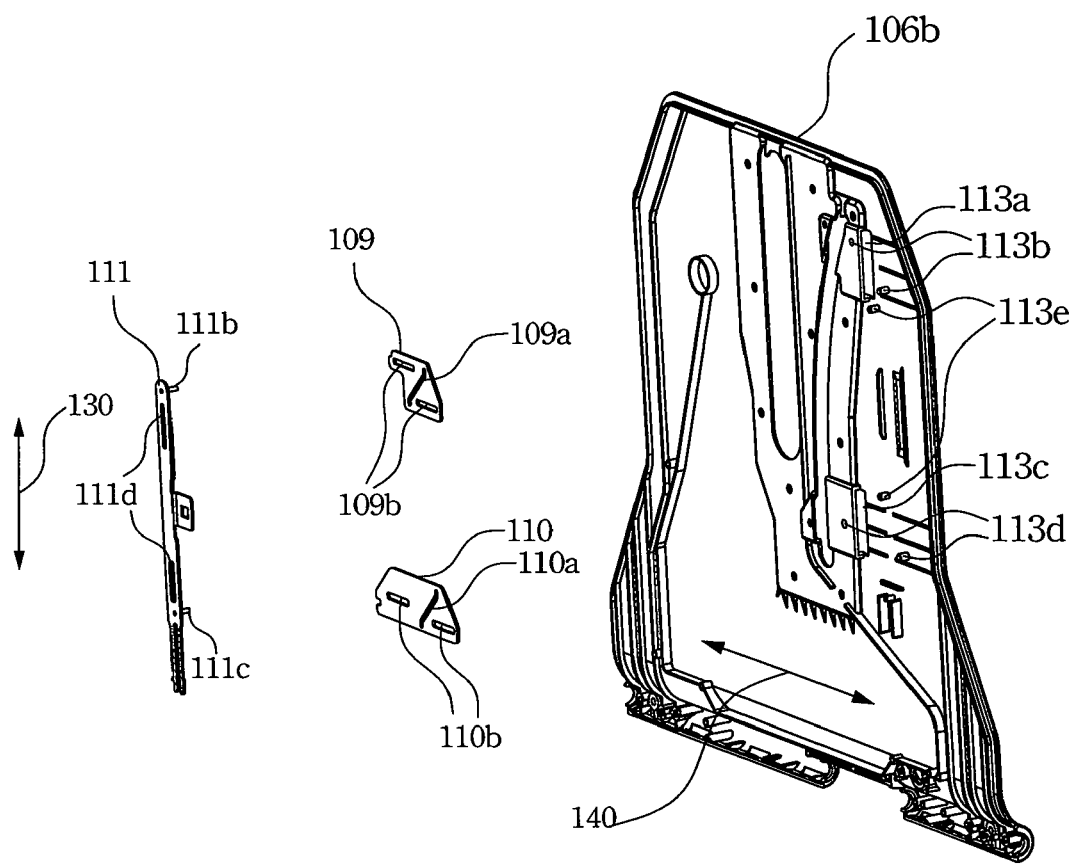

FIGS. 3-4 illustrate enlarged views of parts in connection mechanism as illustrated in FIG. 2. Referring to FIG. 3, an extension 106f of the control button 106e is led through a through hole 112a and connected to a connection hole 111a of the drive member 111 when the control button 106e, the housing wall 106a and the drive member 111 are assembled. The control button 106e can be slid within a concave section 112 of the housing wall 106a so as to carry the drive member 111 along.

Referring to FIG. 4, when all parts are assembled, the latch 109 is inserted into a guide slot 113a while the latch 110 is inserted into a guide slot 113c. Position pin 113b engages within sliding grooves 109b of the latch 109 such that the latch 109 can be slid along a direction 140. Position pin 113d engages within sliding grooves 110b of the latch 110 such that the latch 110 can be slid along the direction 140. Position pin 113e engages within sliding grooves 111d of the drive member 111 such that the drive member 111 can be slid along a direction 130, which is substantially perpendicular to the direction 140. In addition, drive pins (111b; 111c) of the drive member 111 respectively engage a sliding groove 109a of the latch 109 and a sliding groove 110a of the latch 110. The sliding groove 109a is substantially in parallel with the sliding groove 110a. Both the sliding grooves (109a, 110a) extend along a direction, which forms an included angle between such direction and the direction 130, and an included angle between such direction and the direction 140. Therefore, when the drive member is slid along the direction 130, interactions between the drive pins (111b; 111c) and the sliding grooves (109a; 110a) enable the latches (109; 110) to slid along the direction 140.

Figure 9:
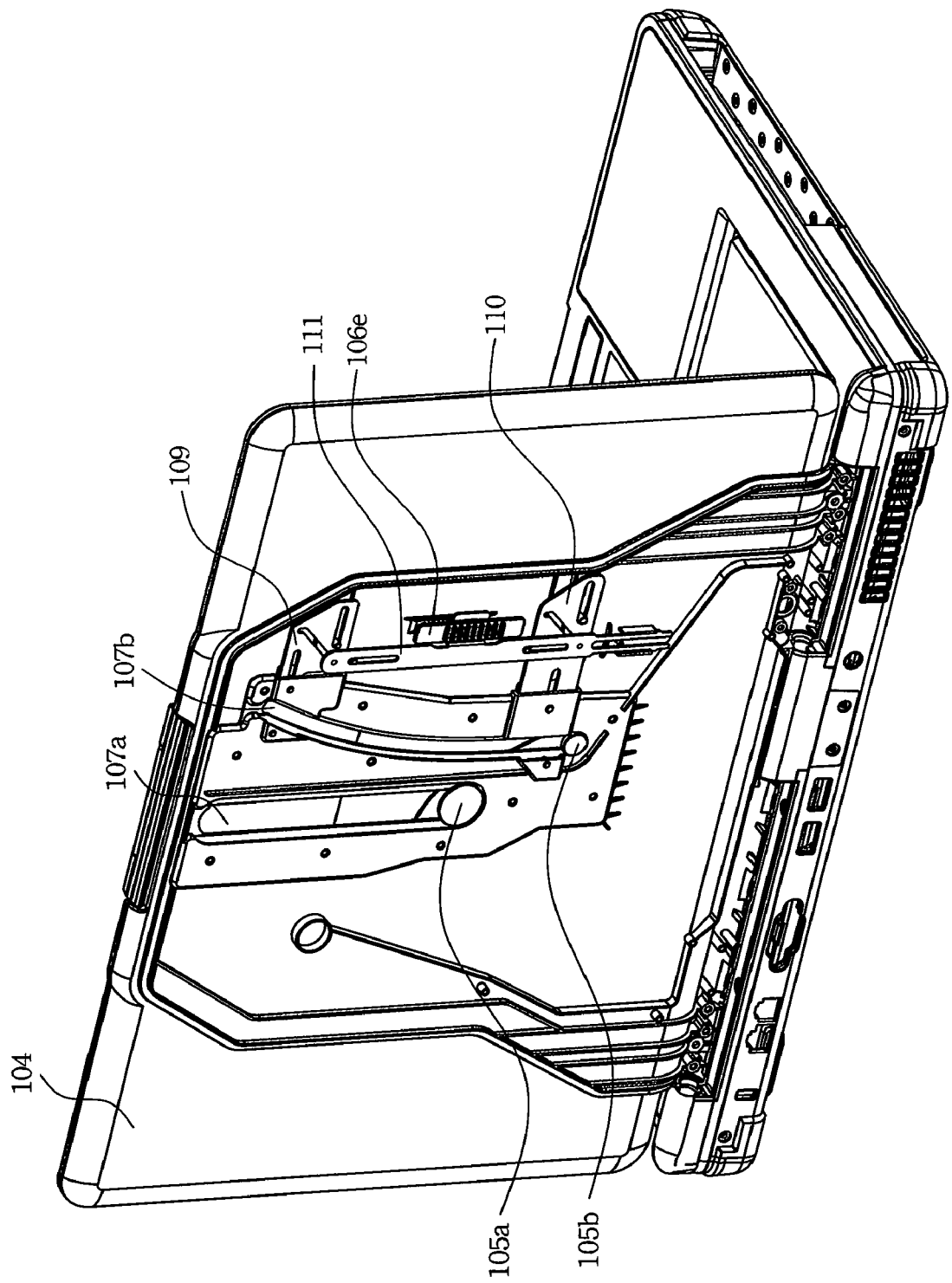
FIG. 9 illustrates an unlock status of the displayer according to one preferred embodiment of this invention.

All parts (except the housing wall 106a) as illustrated in FIG. 2 are put together to form the assembled status as illustrated in FIG. 9. FIG. 9 illustrates an unlock status of the displayer according to one preferred embodiment of this invention.

Figure 6:
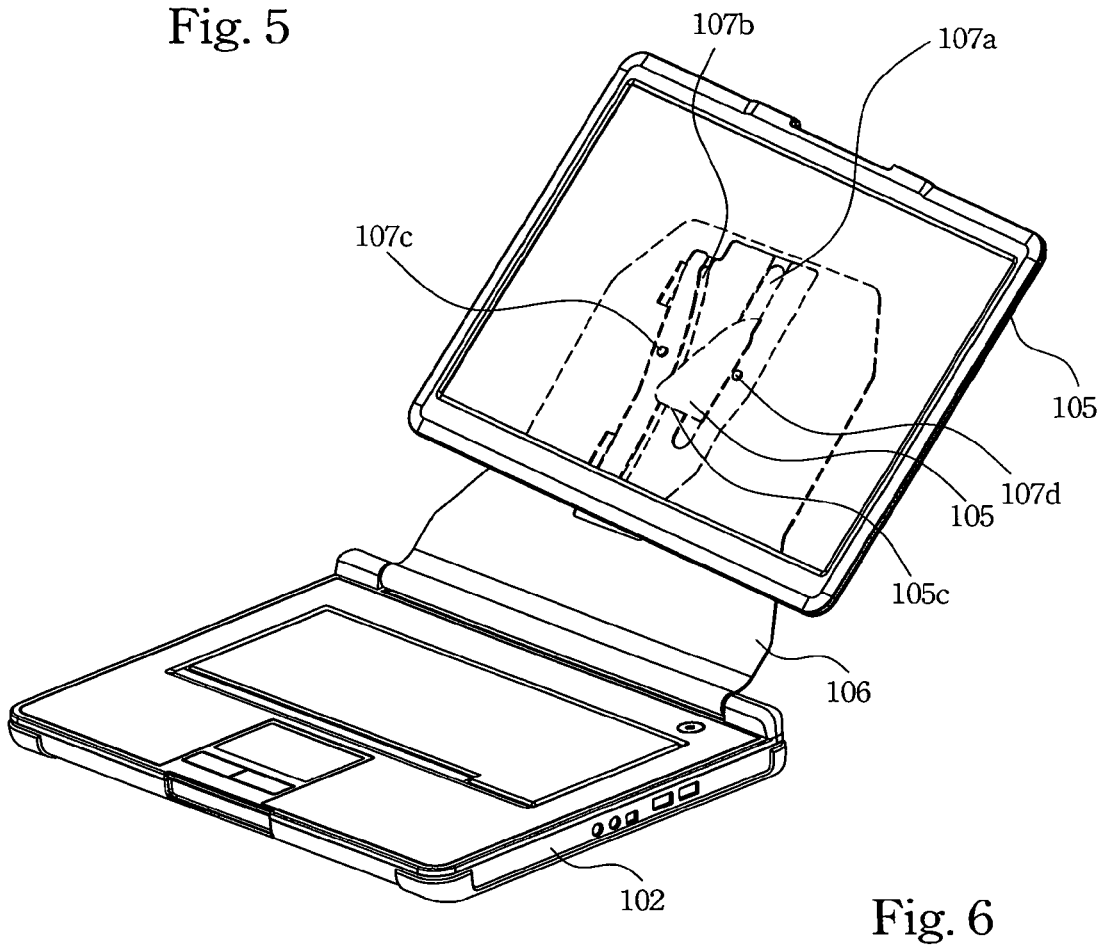
Figure 7:
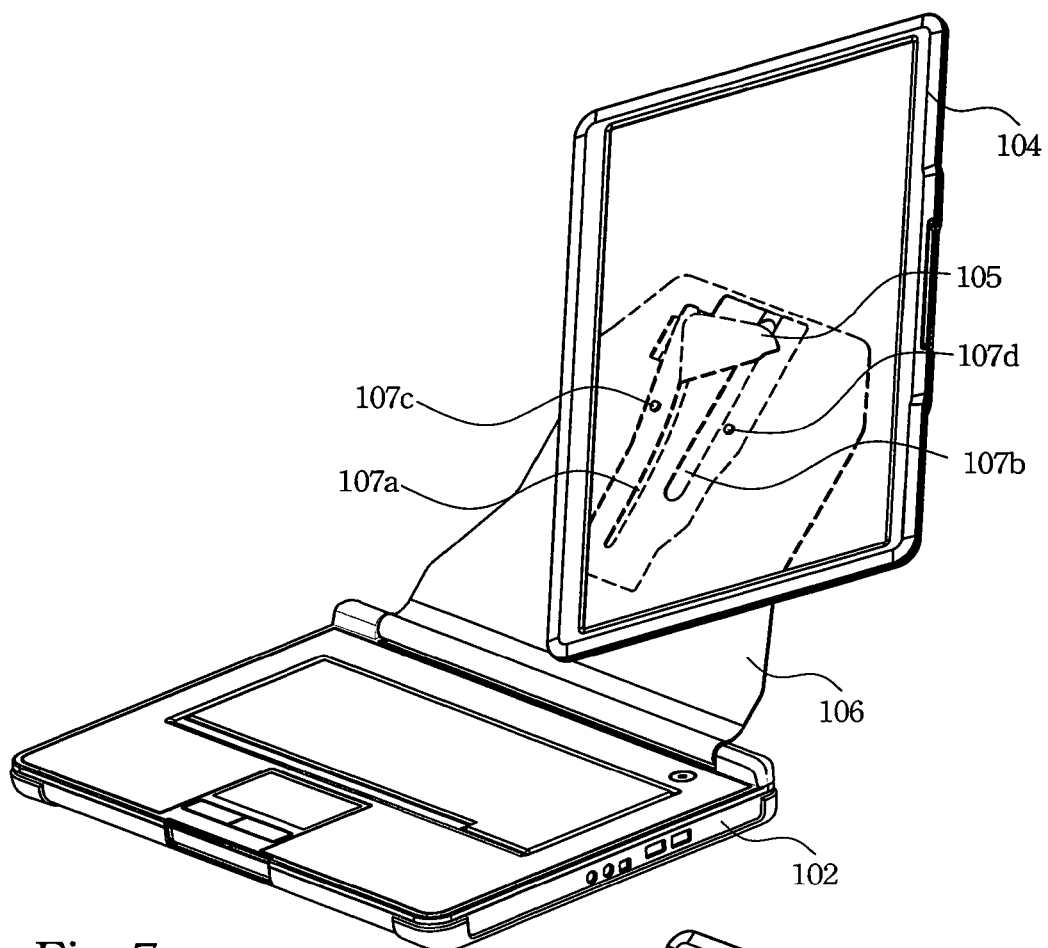
Figure 8:
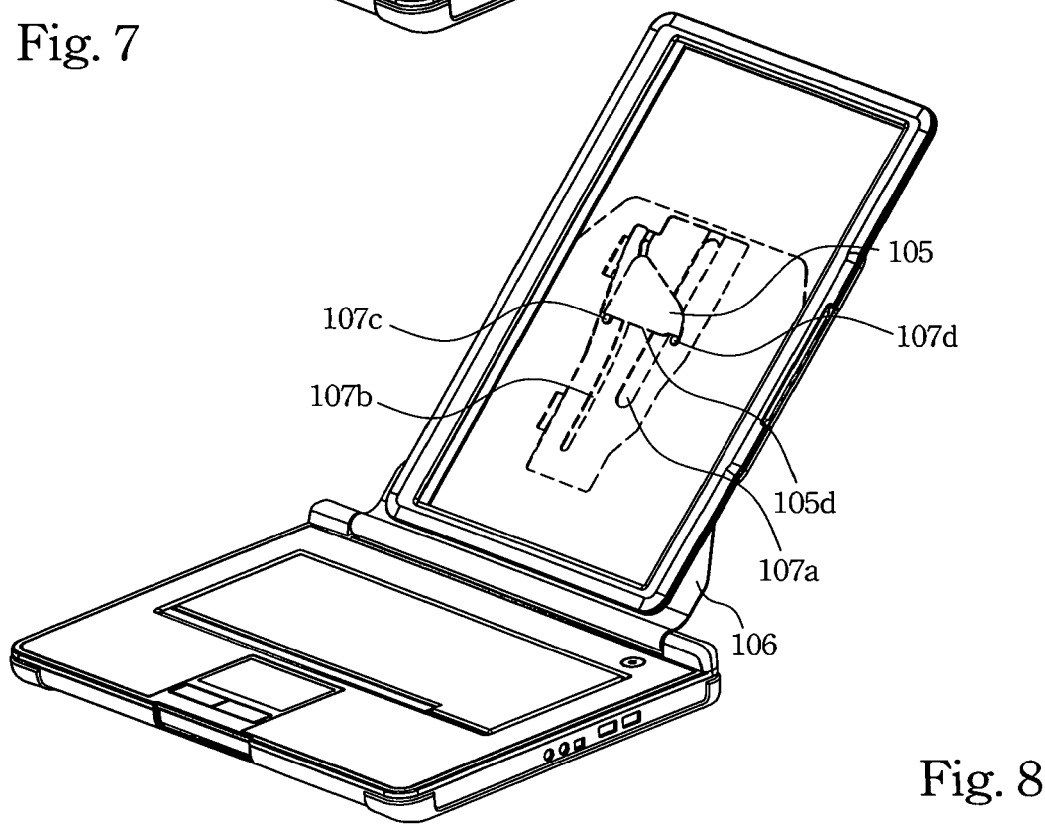

FIGS. 5-8 illustrate a series of views to show how the displayer rotates from a landscape mode (see FIG. 5) to a portrait mode (see FIG. 8). The parts illustrated in dashed-lines are the parts behind the display screen 104a.

Figure 5:
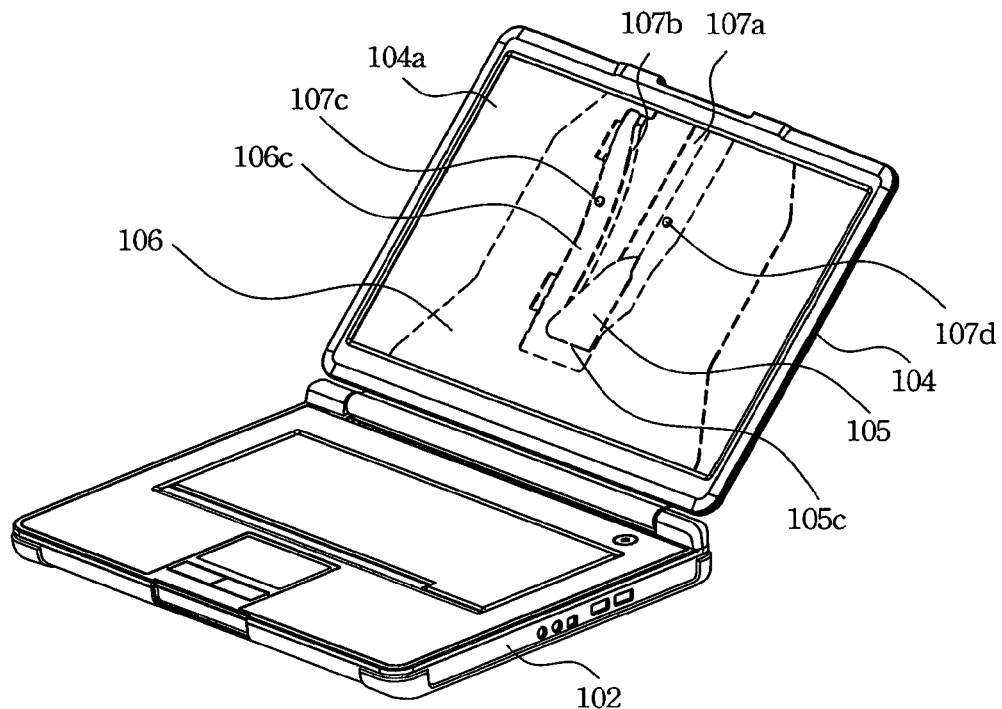
FIGS. 5-8 illustrate a series of views to show how the displayer rotate from a landscape mode to a portrait mode.

Referring to FIG. 5, the displayer 104 is in landscape mode (the displayer 104 with a relatively long edge adjacent to the host 102). In this case, the connection member 105 is located at the bottom ends of the two sliding slots (107a; 107b) while the displayer 104 has the relatively long edge supported by the supporting frame 106.

Referring to FIG. 6, the connection member 105 is being slid upwards along with the displayer 104 and led through an intervening gap between two suspending ribs (107c; 107d). In order to lead the connection member 105 (of a substantially triangle) through the intervening gap between two suspending ribs (107c; 107d), the connection member 105 needs to have a shortest edge shorter than an interval between two suspending ribs (107c; 107d).

Referring to FIG. 7, the connection member 105 is being rotated relative to the supporting frame 106. In this case (referring also to FIG. 6), the connection member 105 has the two sliding members (105a; 105b) slid and rotated relative to the two suspending ribs (107c; 107d) as if the connection member 105 is pivotally connected with the supporting frame 106. The sliding member 105a is located on a central position of the displayer 104.

Referring to FIG. 8, the connection member 105 has a relatively long edge supported by two suspending ribs (107c; 107d) while the displayer 104 has the relatively short edge supported by the supporting frame 106. That is, the displayer 104 is in portrait mode. In order to have the connection member 105 (of a substantially triangle) supported by two suspending ribs (107c; 107d), the connection member 105 needs to have a relatively long edge larger than an interval between two suspending ribs (107c; 107d).

In case the displayer 104 is desired to rotate from the portrait mode to the landscape mode, the displayer 104 can be operated from FIG. 8 back to FIG. 5.

Figure 10:
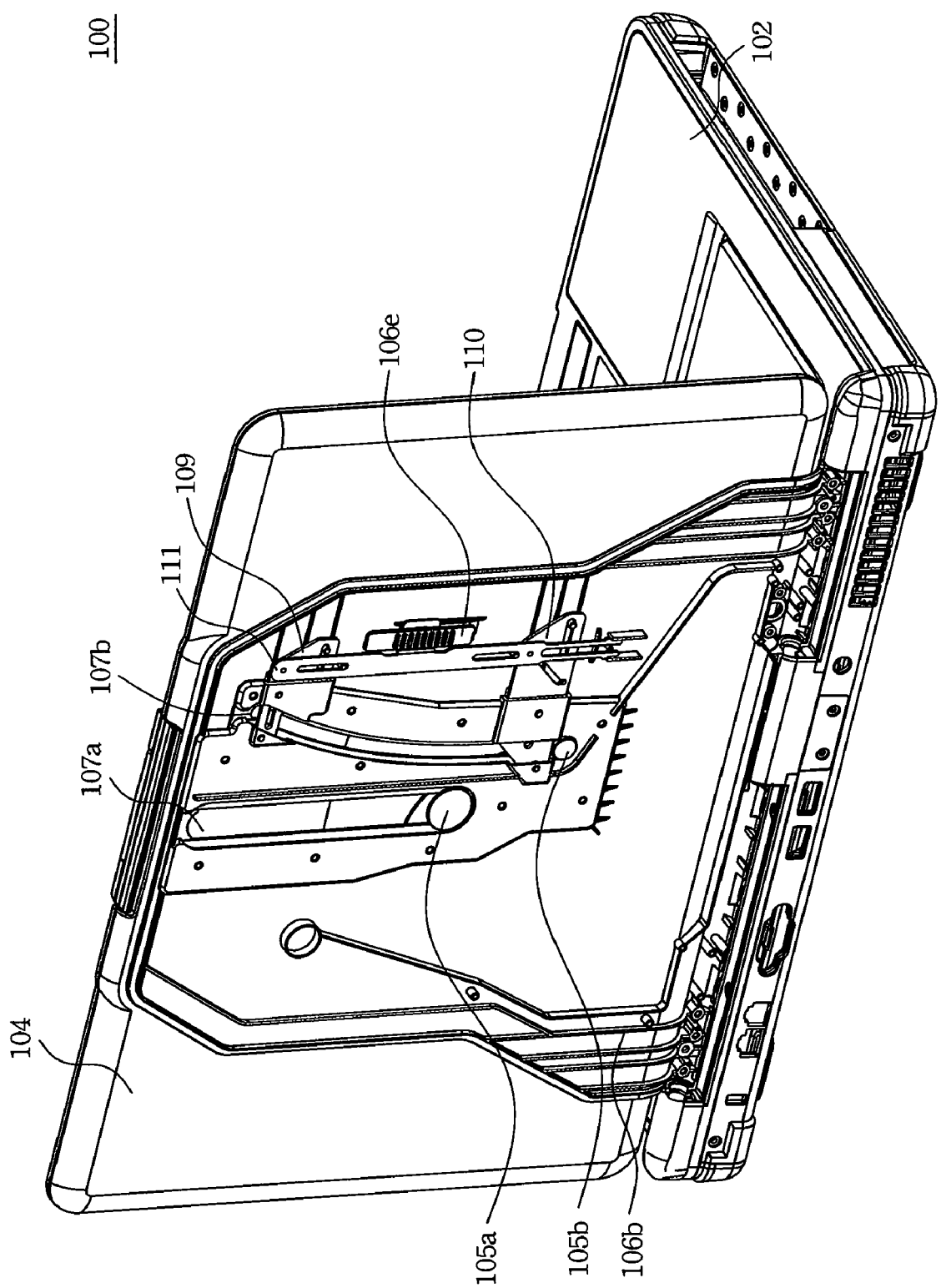
FIG. 10 illustrates a lock status of the displayer in landscape mode according to one preferred embodiment of this invention.

FIG. 10 illustrates a lock status of the displayer in landscape mode according to one preferred embodiment of this invention (the housing wall 106a is removed for clearly illustrating the parts therein). When the displayer 104 is in landscape mode (see also FIG. 5), the control button 106e is used to slide the drive member 111 along the direction 130, and the latches (109; 110) are slid to cross the curved sliding slot 107b. In this lock status, the sliding member 105b is connected at a bottom end of the curved sliding slot 107b by the latch 110 such that the displayer cannot be rotated relative to the host 102.

Figure 11:
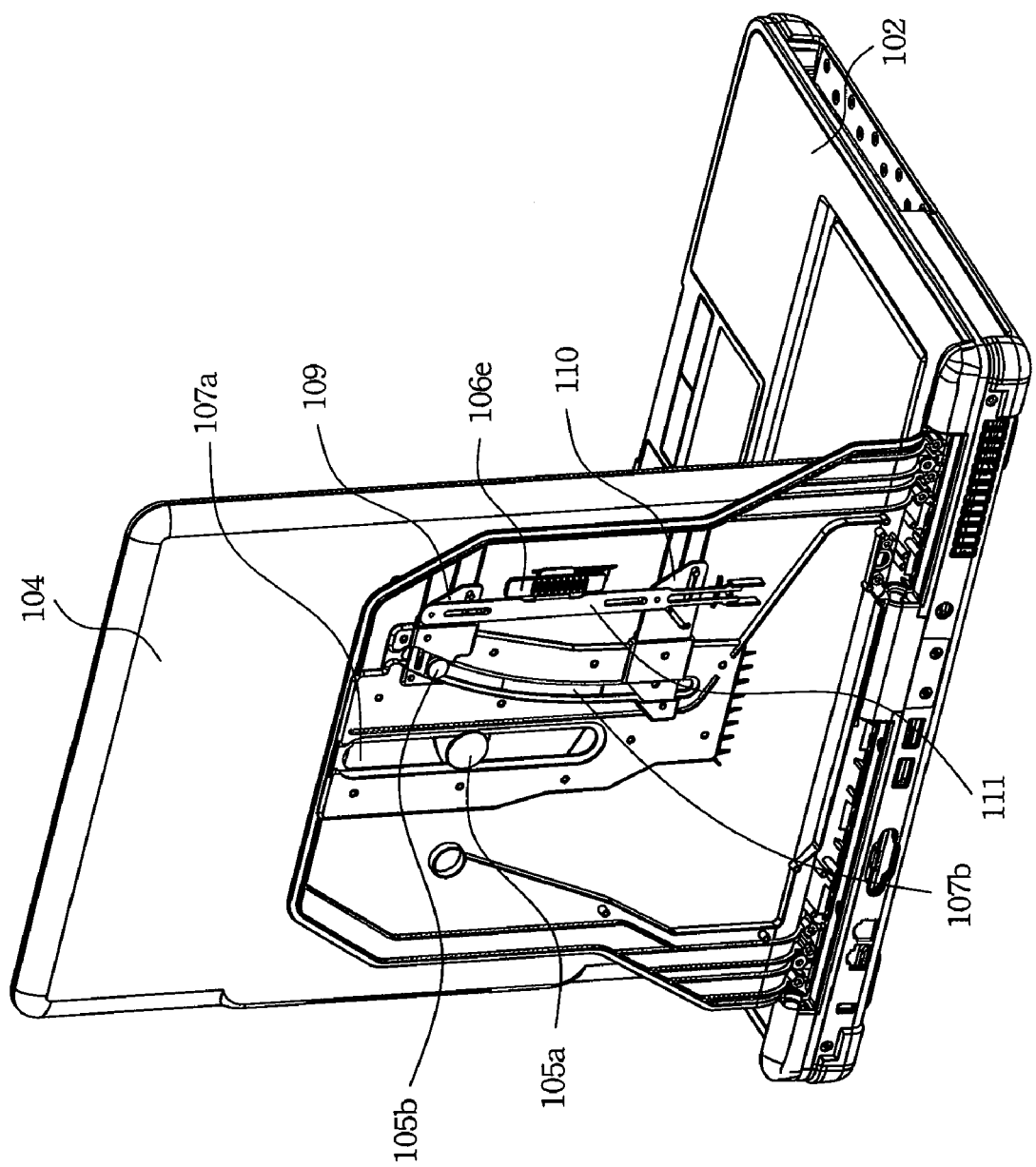
FIG. 11 illustrates a lock status of the displayer in portrait mode according to one preferred embodiment of this invention.

FIG. 11 illustrates a lock status of the displayer in portrait mode according to one preferred embodiment of this invention (the housing wall 106a is removed for clearly illustrating the parts therein). When the displayer 104 is in portrait mode (see also FIG. 8), the control button 106e is used to slide the drive member 111 along the direction 130, and the latches (109; 110) are slid to cross the curved sliding slot 107b. In this lock status, the connection member 105 is supported by the two suspending ribs (107c; 107d) (see FIG. 8) and the sliding member 105b is restricted by the latch 110 such that the displayer cannot be rotated relative to the host 102.

Although the discussed embodiments only address the lock mechanism for restricting the sliding member 105b within the sliding slot 107b so as to prevent the displayer from rotating relative the host 102, persons skilled in the art may design a similar mechanism (not illustrated in drawings) to restricting the sliding member 105a within the sliding slot 107a to achieve the purpose.

The terms "substantially" as used herein may be applied to modify any quantitative representation, which could permissibly vary without resulting in a change in the basic function to which it is related.

According to discussed embodiments, the present invention provides a portable computer, which is equipped with a displayer readily switchable between the portrait mode and the landscape mode for performing preferable functionalities. Moreover, a lock mechanism is also provided to temporarily secure the displayer in the portrait mode or the landscape mode to prevent from rotation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A portable computer, comprising:
   a host;
   a supporting frame being pivotally connected with the host and having a straight sliding slot and a curved sliding slot;
   a displayer having two sliding members, which are pivotally connected with the supporting frame and slidably connected with the straight sliding slot and the curved sliding slot respectively, the displayer being operable to rotate relative to the supporting frame by using either one of the two sliding members as a pivot;
   two latches being slidably connected with the supporting frame; and
   a drive member being slidably connected with the two latches and operable to control where either one of the two latches is located.

2. The portable computer of claim 1, wherein the drive member is slid along a first direction substantially perpendicular to a second direction, along which the two latches are slid.

3. The portable computer of claim 2, wherein each latch has a sliding groove for the drive member sliding to drive the latch, the two sliding grooves are substantially in parallel with each other, the sliding groove extends along a third direction, which forms an included angle between the first and third directions, and an included angle between the second and third directions.

4. The portable computer of claim 3, wherein the drive member comprises two drive pins being slidably connected with corresponding sliding grooves.

5. The portable computer of claim 1, further comprising a control button connected to the drive member through a housing wall of the supporting frame.

6. A portable computer, comprising:
   a host;
   a supporting frame being pivotally connected with the host and having a straight sliding slot and a curved sliding slot;
   a displayer having two sliding members, which are pivotally connected with the supporting frame and slidably connected with the straight sliding slot and the curved sliding slot respectively, the displayer being operable to rotate relative to the supporting frame by using either one of the two sliding members as a pivot;
   a latch being slidably connected with the supporting frame; and
   a drive member being slidably connected with the latch and operable to control where the latch is located.

7. The portable computer of claim 6, wherein the drive member is slid along a first direction substantially perpendicular to a second direction, along which the latch is slid.

8. The portable computer of claim 7, wherein the latch has a sliding groove for the drive member sliding to drive the latch, the sliding groove extends along a third direction, which forms an included angle between the first and third directions, and an included angle between the second and third directions.

9. The portable computer of claim 8, wherein the drive member comprises a drive pin being slidably connected with the sliding groove.

10. The portable computer of claim 6, further comprising a control button connected to the drive member through a housing wall of the supporting frame.

* * * * *